United States Patent
Malur Srinivasan et al.

(10) Patent No.: US 12,141,665 B2
(45) Date of Patent: Nov. 12, 2024

(54) IDENTIFYING AND QUANTIFYING CONFOUNDING BIAS BASED ON EXPERT KNOWLEDGE

(71) Applicant: FUJITSU LIMITED, Kawasaki (JP)

(72) Inventors: Ramya Malur Srinivasan, San Diego, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 1044 days.

(21) Appl. No.: 17/037,303

(22) Filed: Sep. 29, 2020

(65) Prior Publication Data

US 2022/0101187 A1    Mar. 31, 2022

(51) Int. Cl.
*G06N 20/00* (2019.01)
*G06F 18/22* (2023.01)
*G06F 18/24* (2023.01)

(52) U.S. Cl.
CPC ............. *G06N 20/00* (2019.01); *G06F 18/22* (2023.01); *G06F 18/24* (2023.01)

(58) Field of Classification Search
None
See application file for complete search history.

(56) References Cited

U.S. PATENT DOCUMENTS 10,866,992 B2 * 12/2020 Pol ..................... G06F 16/367

OTHER PUBLICATIONS

Guo, Ruocheng, Lu Cheng, Jundong Li, P. Richard Hahn, and Huan Liu. "A survey of learning causality with data: Problems and methods." ACM Computing Surveys (CSUR) 53, No. 4 (2020): 1-37. (Year: 2020).*
Kusner, Matt J., Joshua Loftus, Chris Russell, and Ricardo Silva. "Counterfactual fairness." Advances in neural information processing systems 30 (2017). (Year: 2017).*
EP Search Report in Application No. 21190085.7 dated Feb. 18, 2022.
Wachinger et al., "Quantifying Confounding Bias in Neuorimaging Datasets with Causal Inference" Springer Nature Switzerland AG 2019, LNCS, pp. 484-492, Jul. 9, 2019.
Correa et al., "Causal Effect Identification by Adjustment under Confounding and Selection Biases" Proceedings of the Thirty-First AAAI Conference on Artificial Intelligence (AAA-17), Feb. 4, 2017.

(Continued)

*Primary Examiner* — Vincent Gonzales
(74) *Attorney, Agent, or Firm* — Maschoff Brennan

(57) ABSTRACT

A method may include obtaining a machine-learning model trained with respect to a subject. The machine-learning model may be based on a plurality of factors that correspond to the subject. The method may include obtaining human provided information regarding the subject. The expert information may indicate relationships between the plurality of factors with respect to how the plurality of factors affect each other. The method may include generating a structural causal model that represents the relationships between the plurality of factors based on the expert information. The method may include identifying, as a confounding factor and based on the structural causal model, a factor of the plurality of factors that causes a confounding bias in the machine-learning model. The method may include estimating the confounding bias based on the identified confounding factor.

14 Claims, 4 Drawing Sheets

(56) References Cited

OTHER PUBLICATIONS

Guo et al., "A Survey of Learning Causality with Data: Problems and Methods" ACM Computing Surveys, vol. 53, No. 4, Article 75, Jul. 2020.
Quantifying Confounding Bias in Generative Art: A Case Study Feb. 23, 2021, Fujitsu Laboratories of America.
Kaiji Lu et al. "Gender Bias in Neural Natural Language Processing" arXiv:1807.11714; May 30, 2019.
Dixon et al. "Measuring and Mitigating Unintended Bias in Text Classification" AAAI/ACM Conference on AI, Ethics, and Society; Dec. 2018.
Huang et al. "Reducing Sentiment Bias in Language Models via Counterfactual Evaluation" arXiv:1911.03064; Apr. 30, 2020.
Bordia et al. "Identifying and Reducing Gender Bias in Word-Level Language Models" arXiv:1904.03035; Apr. 5, 2019.
Sheng et al. "The Woman Worked as a Babysitter: On Biases in Language Generation" arXiv:1909.01326; Oct. 23, 2019.
Byran Clark "Report: Female-sounding voice assistants fuel gender bias" Insider May 21, 2019 https://thenextweb.com/insider/2019/05/22/report-female-sounding-voice-assistants-fuel-gender-bias/.
Keith Darnay "UN Report: Gender bias in voice assistant coding" May 23, 2019 https://www.kxnet.com/news/un-report-gender-bias-in-voice-assistant-coding/.
Cade Metz "There Is a Racial Divide in Speech-Recognition Systems, Researchers Say" The New York Times; Sep. 2, 2020; https://www.nytimes.com/2020/03/23/technology/speech-recognition-bias-apple-amazon-google.html.
Antonio Torralba et al. "Unbiased Look at Dataset Bias" CVPR 2011; Jun. 20, 2011.
Tatiana Tommasi et al. "A Deeper Look at Dataset Bias" arXiv:1505.01257 [cs.CV] May 6, 2015.
Wang et al. "Controlling biases and diversity in diverse image-to-image translation" Computer Vision and Image Understanding, vol. 202, Jul. 23, 2019.
Jang et al. "Quantification of Gender Representation Bias in Commercial Films based on Image Analysis" Proceedings of the ACM on Human-Computer Interaction, Nov. 2019, Article No. 198.
Judea Pearl "Causality: Models, Reasoning, and Inference" Econometric Theory, 19, 2003, 675-685.
Sigal Samuel "This AI makes you look like a masterpiece—while teaching you about its own bias" VOX Jul. 25, 2019 https://www.vox.com/future-perfect/2019/7/25/20708589/ai-portraits-art-bias-classical-painting.
AIportraits—AI Photo Editor; Digital Deep Art Portrait App; Informe Laboratories, Inc.; Apple App Store; https://apps.apple.com/app/apple-store/id1473569051 retrieved Oct. 5, 2020.
Philippe Besse et al. "A survey of bias in Machine Learning through the prism of Statistical Parity for the Adult Data Set" Machine Learning; Computers and Society; Mar. 31, 2020.
Sahil Verma et al. "Fairness Definitions Explained" 2018 ACM/IEEE International Workshop on Software Fairness; Mar. 29, 2018.
"Fairness in ML 2: Equal opportunity and odds" Privacy & Fairness in Data Science CompSci 590.01; 2018; Duke Computer Science.
Moritz Hardt et al. "Equality of Opportunity in Supervised Learning" Machine Learning. arXiv:1610.02413 (cs); Oct. 7, 2016.
Geoff Pleiss et al. "On Fairness and Calibration" NIPS'17: Proceedings of the 31st International Conference on Neural Information Processing Systems; Dec. 2017.
Sam Corbett-Davies et al. "The Measure and Mismeasure of Fairness: A Critical Review of Fair Machine Learning" Sep. 11, 2018.
Kaiming He et al. "Deep Residual Learning for Image Recognition" 2016 IEEE Conference on Computer Vision and Pattern Recognition (CVPR) Jun. 2016.
Stefano M. Iacus et al. "Causal Inference without Balance Checking: Coarsened Exact Matching" Political Analysis, 20, 1, pp. 1-24. 2012.
"DAGitty—draw and analyze causal diagrams" http://www.dagitty.net; 2016.
"Biases in Generative Art: A Causal Look from the Lens of Art History" Jul. 2017.
EP Office Action in Application No. 21190085.7 dated Feb. 8, 2022.
European Summons to Attend Oral Proceeding dated Sep. 6, 2023 as received in application No. 29 190 085.7.
Decision to Refuse a European Patent Application dated Feb. 27, 2024 as received in application No. 21190085.7.

* cited by examiner

IDENTIFYING AND QUANTIFYING CONFOUNDING BIAS BASED ON EXPERT KNOWLEDGE

The present disclosure generally relates to identifying and quantifying confounding bias based on expert knowledge.

BACKGROUND

In general, bias is a prejudice in favor of or against one thing, person, or group compared with another. In data, bias results in variables that do not properly capture a subject being represented. Thus, when data is biased, conclusions based on the data may not be representative of the subject being represented.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In an example embodiment, a method may include obtaining a machine-learning model trained with respect to a subject. The machine-learning model may be based on a plurality of factors that correspond to the subject. The method may include obtaining human provided expert information regarding the subject. The expert information may indicate relationships between the plurality of factors with respect to how the plurality of factors affect each other. The method may include generating a structural causal model that represents the relationships between the plurality of factors based on the expert information. The method may include identifying, as a confounding factor and based on the structural causal model, a factor of the plurality of factors that causes a confounding bias in the machine-learning model. The method may include estimating the confounding bias based on the identified confounding factor.

In some embodiments, the method may include adjusting the machine-learning model based on the estimated confounding bias to reduce the confounding bias. In some aspects, the subject may be artwork and the human provided expert information may be obtained from an art expert. Identifying the factor as the confounding factor may include performing a causal inference analysis with respect to the structural causal model.

In some aspects, generating a structural causal model may include identifying from the plurality of factors an input factor and an output factor in which the input factor affects an outcome of the output factor, and determining a dependency between the input factor and the output factor.

In some aspects, estimating the confounding bias may include determining a perceived causal effect related to the subject, determining, using an objective analysis architecture, an observed causal effect, and determining a difference between the perceived causal effect and the observed causal effect.

In some embodiments, the subject is image classification. Determining the perceived causal effect may include matching images based on the confounding factor. Determining the observed causal effect may include matching images using a matching algorithm. The difference between the perceived causal effect and the observed causal effect may include a difference between the matching images based on the confounding factor and the matching using the matching algorithm.

In another example embodiment, one or more computer-readable storage media may store instructions that, in response to being executed by one or more processors cause a system to perform the above described method and any suitable variations.

In yet another example embodiment, a system may include one or more processors and one or more computer-readable storage media storing instructions that, in response to being executed by the one or more processors cause the system to perform the above described method and any suitable variations.

The objects and advantages of the embodiments will be realized and achieved at least by the elements, features, and combinations particularly pointed out in the claims. Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DETAILED DESCRIPTION

Figure 1A:
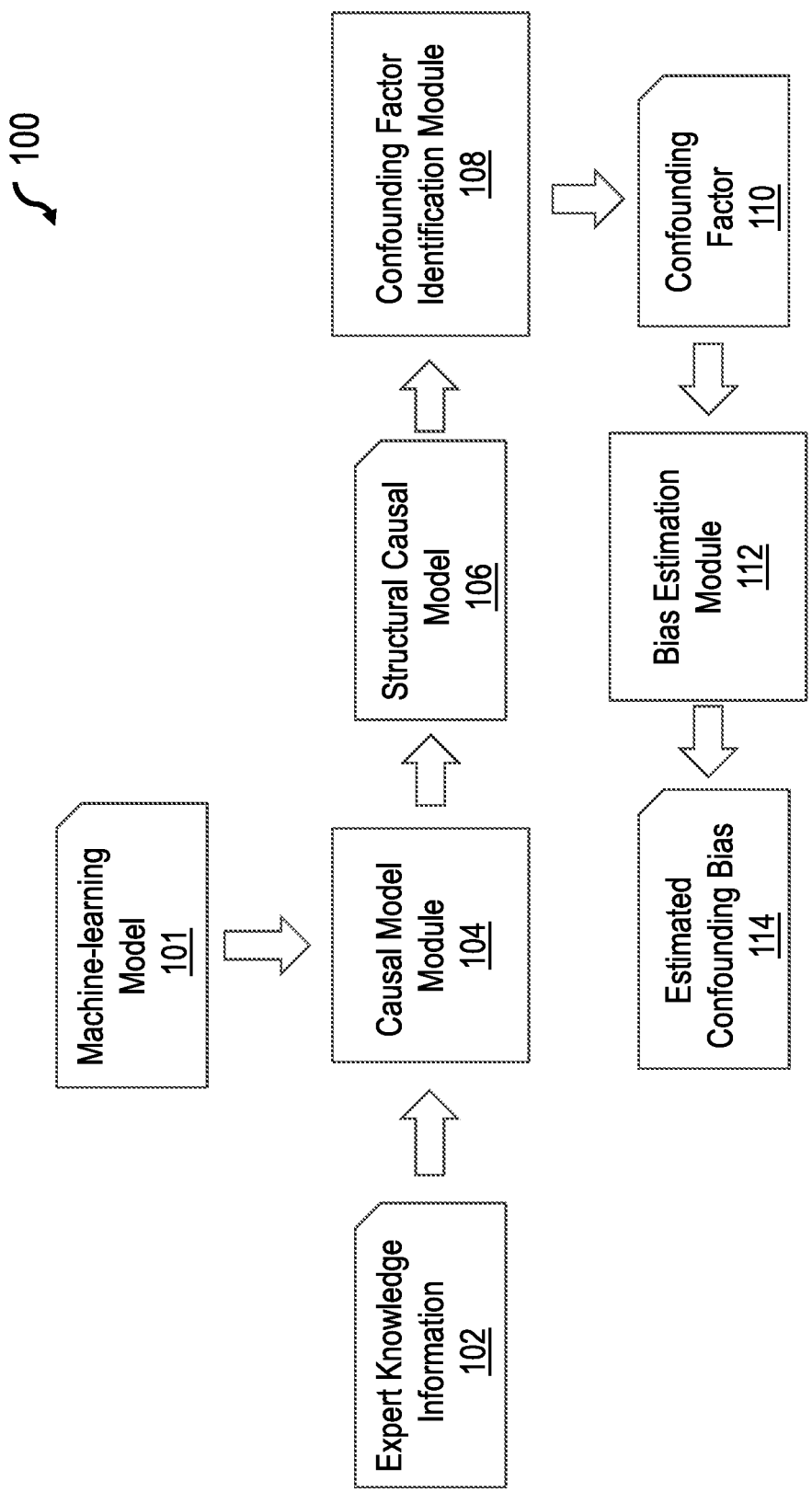
FIG. 1A is a diagram representing an example environment related to quantifying confounding bias based on expert knowledge.

Some embodiments described in the present disclosure relate to quantifying confounding bias based on expert knowledge. In general, bias is a prejudice in favor of or against one thing, person, or group compared with another. In modeling or analyzing a subject, bias may result in variables that do not properly capture a subject being represented. Thus, when data or models are biased, it means that conclusions made based on the data or models are not representative of the subject being represented.

A confounder (also confounding variable, confounding factor, or lurking variable) may be a variable that influences both a dependent variable and an independent variable, causing a spurious association. A confounding bias may similarly be a bias that causes spurious correlations between input and output variables.

The disclosed embodiments include aspects for identifying and quantifying confounding bias by leveraging expert knowledge. The disclosed embodiments may estimate bias based on expert knowledge, which may be incorporated into a structural causal model that is in turn evaluated for bias using rules of causal inference. According to the disclosed embodiments, bias may be quantified as the difference between perceived causal effect (e.g., based on knowledge of experts) and observed causal effect (based on data).

As mentioned above, confounding bias may result in models not being representative of the subject being represented. This may be problematic for applications that implement such biased models. Machine learning may be implemented in a variety of fields such as healthcare, judiciary, finance, among others. In such circumstances, models may be used to represent people and expected outcomes based on various factors. For example, machine learning may be implemented to help determine persons that may be eligible for a credit card, persons that should be treated by a specific drug, persons that should be released on bail, etc. However, if the models used for machine learning are biased against specific attributes (e.g., race, gender, age, etc.), then certain people may be treated unfairly or incorrectly as a result of the bias.

In a further example, machine learning may be used to create generative art. Generative art refers to art that in whole or in part has been created with the use of an autonomous system. In such applications, machine learning may implement models to determine features of an artwork that would otherwise require decisions made directly by the artist. However, if the models used for the generative artwork include bias, then the resulting generative art may be biased, inaccurate or non-representative. Additionally or alternatively, machine learning may be used to analyze art, but the models and/or data used to train the corresponding machine learning may also include bias that may skew the analysis.

Previously, bias has been estimated in various applications such as text, categorical data, voice data, images, and others. However, such bias estimation has been implemented in circumstances where the bias is clearly defined and when the ground truth regarding the bias is known. As used herein, ground truth refers to information provided by direct observation (e.g., empirical evidence) rather than information provided by inference. However, it is not always possible to find the ground truth regarding bias by direct observation, and previous bias estimation techniques may not be effective for estimating bias when the ground truth regarding the bias is not known. For example, some subjects, such as the generation and/or analysis of art may be relatively subjective such that the data and models used in machine learning applications related to such subjects may have embedded biases (e.g., hidden or subconscious biases in information related to the subject that is obtained from humans).

Accordingly, the disclosed embodiments may be used to identify, quantify, and adjust for bias in models when the ground truth regarding the bias is not necessarily known or apparent, for example, before the model is generated. Such aspects may be used to improve the models used, for example, in machine learning applications.

In the disclosed embodiments, an expert may provide expert knowledge, which may include information about the dependencies between various factors or variables of interest based on their domain specific knowledge. Thus, the expert may provide information specifying dependencies that can exist in data. This expert information may then be used to identify bias in data or a model, which may be used, for example, in machine learning. The expert knowledge may be used to generate a causal model, and the structure of the causal model may be used to identify bias in either data or models based on the data. Based on the structural causal model, the specific type of bias (whether it is data-specific or model-specific) may be determined. One specific type of bias that may be determined is confounding bias, which is a model specific bias. Once the confounding bias is determined, the bias may be reduced or eliminated, so results based on the models do not include the confounding bias.

Embodiments of the present disclosure are explained with reference to the accompanying drawings.

FIG. 1A is a diagram representing an example environment 100 related to inferring events that occur with respect to a software program, arranged in accordance with at least one embodiment described in the present disclosure. The environment 100 may include a causal model module 104, which may obtain a model trained with respect to a subject, such as the machine-learning model 101. The machine-learning model 101 may be based on a plurality of factors that correspond to the subject. The causal model module 104 may also obtain human provided expert information regarding the subject, such as expert knowledge information 102. The expert knowledge information 102 may indicate relationships between the plurality of factors with respect to how the plurality of factors affect each other. The causal model module 104 may identify an input factor and an output factor from the plurality of factors. The input factor may affect an outcome of the output factor, and the causal model module 104 may identify the input and output factors based on this relationship.

The causal model module 104 may be configured to generate a structural causal model 106, which may represent relationships between the plurality of factors with respect to how the plurality of factors affect each other. Thus, the structural causal model 106 may be based on the expert knowledge information 102 and may indicate the relationships between the plurality of factors that correspond to the subject. To generate the structural causal model 106, the causal model module 104 may determine a dependency between the input factor and the output factor, and/or dependencies between multiple factors. In one example, the causal model module 104 may receive a textual description of the expert knowledge information 102, and may use the textual description to determine the relationships between the plurality of factors that correspond to the subject, and/or dependencies between the factors.

The environment 100 may further include a confounding factor identification module 108, which may identify a confounding factor 110 based on the structural causal model 106. The confounding factor 110 may be a factor of the plurality of factors from the expert knowledge information 102 that are represented in the structural causal model 106 (and represent the plurality of factors in the machine-learning model 101). The factor may be identified as the confounding factor 110 because it causes a confounding bias in the machine-learning model 101.

The environment 100 may further include a bias estimation module 112 which may be trained or configured to estimate an estimated confounding bias 114 based on the confounding factor 110 identified by the confounding factor identification module 108. The estimated confounding bias 114 may be an estimate of the confounding caused by the confounding factor 110.

The expert knowledge information 102 may be any suitable information obtained from an expert on a subject knowledgeable by the expert. In some embodiments, the expert knowledge information 102 may be textual representation of the information obtained from the expert, although other configurations may be implemented. In some aspects, the expert knowledge information 102 may be based on one or more opinions of one or more experts. For example, if the subject is artwork then the expert knowledge information 102 may be information regarding factors that affect artwork. In such aspects, the factors may include geography, period style, artist style, landscape and any other suitable factors that may affect a specific piece of artwork or art in general.

In another example, the expert may be a finance expert and the subject may be suitability to be granted credit. In such aspects, the factors may include income, credit history, existing debt and any other suitable factors that may affect suitability to be granted credit. In a further example, the expert may be a medical expert and the subject may be treatment of a patient with a drug. In such aspects, the factors may include patient allergies, medical history, existing drug regiments, drug interactions, desired medical outcome and any other suitable factors that may affect treatment of the patient with the drug.

The expert knowledge information 102 may include observed and unobserved factors that correspond to the subject. Observed factors may be factors that may be determined by direct observation (e.g., empirical evidence) and unobserved factors may be factors that are not determined by direct observation. The expert knowledge information 102 may include any factors identified as being relevant by the expert, and such assessments may be subjectively determined by the expert.

As mentioned above, the structural causal model 106 may be generated by the causal model module 104. The structural causal model 106 may indicate dependencies between the factors that correspond to the subject, which in turn may be determined based on the expert knowledge information 102. The expert knowledge information 102 may determine whether there exists an edge between any two variables in the structural causal model 106 and if it exists, what is the direction of that edge. Thus, the expert knowledge information 102 may specify or determine the structural causal model 106 based on the expert knowledge.

Figure 1B:
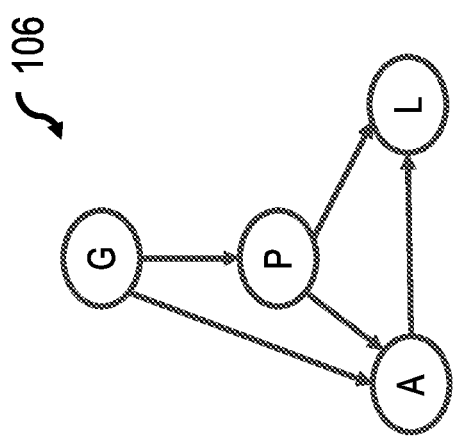
FIG. 1B is a diagram representing an example of a causal model.

FIG. 1B illustrates an example of the structural causal model 106, although other representations of structural causal models may be implemented according to the concepts described herein. In FIG. 1B, the structural causal model 106 is represented by a directed acyclic graph (DAG) which displays relationships between factors or variables (sometimes called nodes). In the illustrated example, the structural causal model 106 includes factors G, P, A and L. The relationships between the factors G, P, A and L are represented with lines extending between the factors. As shown, the lines are directed, meaning they have a single arrowhead indicating their effect. Thus, in the configuration shown in FIG. 1B, factor G has an effect on factor P and factor A, and factor P has an effect on factor A and factor L.

Although the structural causal model 106 includes four factors G, P, A and L and four relationships in between, the structural causal model 106 may include any suitable number of factors and relationships between those factors. Further, the factors and relationships may be based on the expert knowledge information 102 obtained from the expert.

The structural causal model 106 may include factors that are input factors, output factors and confounding factors. Input factors may be factors whose effect on other factors may be determined. Output factors may be factors that the causal effect of the input factor(s) may be determined. Confounding factors may be factors that cause spurious correlations between the input factors and output factors. As mentioned above, in some circumstances some of the factors may be observable (e.g., by empirical evidence) some factors may not be observable.

In one example, the structural causal model 106 of the FIG. 1B represents relationships between factors corresponding to artwork. Thus, the factors may be based on information obtained from an expert in artwork (e.g., the subject of the causal model is artwork). In this example, factor G may represent geography, P may represent period style, A may represent artist style, and L may represent a landscape (e.g., the subject of the artwork). Thus, geography G effects artist style A, geography also effects period style P, which in turn effects both artist style A and landscape L, and artist style A effects landscape L. Specifically, the period style P (e.g., art movements like renaissance, impressionism, etc.) may influence both the artist style A and the landscape L (e.g., the artwork). The period style P in turn could be influenced by the geography G (e.g., the region/nationality of the artist). The geography G may also independently influence the artist style A. These relationships may be encoded in the structural causal model 106 to describe the artwork creation.

In this example, the structural causal model 106 may model a specific artist's style, which is in turn represented by the quantified causal effect of the artist style A on the artwork landscape L. However, there could be many factors influencing the artwork and the structure of the structural causal model 106 may vary based on expert opinions.

As mentioned above, the confounding factor identification module 108 of FIG. 1A may identify the confounding factor 110 based on the structural causal model 106. In some aspects, a causal inference analysis may be performed with respect to the structural causal model to identify a factor as the confounding factor 110. The confounding factor 110 may be identified based on rules of causal interference. In the example of FIG. 1B, rules of causal interference may indicate that period style P is a confounding factor that causes a confounding bias on the landscape L (e.g., the artwork).

As mentioned, rules of causal interference may be used to determine the confounding factor 110. In one example, a set of criteria called "d-separation" may be used to determine the confounding factor 110. Given a causal graph, d-separation criteria may be used to determine backdoor paths that need to be blocked in order to remove confounding effects. Backdoor paths are the paths that point into the input variable from the output variable. Such paths introduce spurious correlations between input and output and therefore may need to be blocked. A variable Z is said to block a path between X and Y if conditioning on Z, renders X and Y independent. Thus, X is the input and Y is the output, and Z is a confounder that influences both X and Y, then conditioning on Z removes the backdoor path. D-separation determines which variables need to be conditioned in order to block the backdoor paths, and these are based on the direction of arrows in the causal graph.

Turning back to FIG. 1A, the bias estimation module 112 will be described in further detail. Once the confounding factor 110 is identified, the bias estimation module 112 may estimate the estimated confounding bias 114 that the confounding factor 110 causes (e.g., on the artwork or other subject).

The bias estimation module 112 may identify which portions of the machine-learning model 101 may be biased. In other words, which confounding factors (e.g., the confounding factor 110) may be implicitly or even unknowingly biasing the model (e.g., analysis of the artwork or other subject). Once the bias is identified, using the confounding factor 110, the bias may then be quantified.

In some aspects, estimating the confounding bias may include determining one or more adjusting factors using a causal analysis tool. Estimating the confounding bias may further include learning representations of images (such as artwork) using a residual network or other suitable neural network. Estimating the confounding bias may further include using a matching algorithm to determine similar images and computing the difference between perceived and observed causal effects.

In some aspects, estimating the confounding bias may include determining a perceived causal effect using the structural causal model trained with respect to the confounding factor, determining an observed causal effect using an objective analysis architecture, and estimating the confounding bias based on a difference between the perceived causal effect and the observed causal effect.

In some circumstances, the subject may be image classification. In such aspects, determining the perceived causal effect may include matching images based on the confounding factor (e.g., using the classifier model), and determining the observed causal effect may include matching images using a matching algorithm. In such aspects, the difference between the perceived causal effect and the observed causal effect may include a difference between the matching based on the confounding factor and the matching using the matching algorithm.

Turning to the example where the subject is artwork, two sets of images belonging to two different artists may be compared. The two sets of images may be matched based on confounding variables. Thus, images from the two sets may be paired based on confounding variables, such that the pairs of images have a same or similar confounding variable. Any remaining variation between the images in the pair may be determined to be caused by differences in artist style.

One or more domain experts (e.g., art expert or expert on another subject) may provide information to identify images in the treatment and control groups corresponding to the two artists styles. The information from the domain expert may then be used to identify confounding factors of interests in each image. For example, the confounding factor may be a specific period style, and the expert may identify images corresponding to the specific period style. Using a classifier model trained to predict period styles, a best match between one of the two artist styles may be determined. A matching algorithm may be implemented to obtain matches using features extracted from the images. In some aspects, the features may be extracted by using a residual network or other suitable neural network. In some aspects, a matching algorithm may use optimum or greedy search, which may be parameterized by a threshold for match, and can have multiple matches. The values of the matched pairs may then be used to estimate counterfactuals. If there are more than one matches, an average of all the matches may be used as the counterfactual.

The confounding bias in modeling an artist's style may be determined. The artists style may be modeled, for example, using a machine-learning model. A set of images of the artist's actual artwork may be represented by A, and a computer-generated set if images (e.g., generative art) in the style of the artist is represented by B. Thus, A corresponds to real artworks of the artist, and B corresponds to generated artworks of the artist. The two artists in this scenario are the real artist and the machine-learning model, and the confounding bias between A and B may be determined.

From knowledge of an art expert, a causal model may be obtained. Using rules of causal inference, we may obtain a set of variables we need to adjust for in removing confounding bias. For examples, variables may include period style. Thus, the machine-learning model may be taught to match images in set A with set B based on the period style. Once we do this, any remaining difference between images in set A and set B should be caused by confounding bias because all pf the remaining factors are the same between set A and set B. To determine the period style, a neural network for image recognition may be implemented. Accordingly, images in set A and set B may be represented by vectors of the period style.

Once the feature representations for the images in the two sets A and B are obtained, the nearest neighbor for elements in set B with elements in set A may be determined using a matching procedure. If there are more than one match, then the average of all matches may be used.

In some aspects, bias may be quantified as the difference between the perceived causal effect and the observed causal effect. For example, the bias may be quantified by the formula:

$$y - \frac{1}{|M_i|} \sum_{j \in M_i} y_j$$

Where the observed effect y corresponds to the concatenated features of the images without adjusting for confounders, and the perceived causal effect is the concatenated feature representation of the counterfactual obtained after incorporating expert knowledge and adjusting for confounders (e.g., by matching with similar period styles in the other artist's style). In the above formula, for every image i in the set B, a match may be determined as the average of all the nearest neighbors in set A. Thus, $M_i$ corresponds to the set of all nearest neighbors of the image i belonging to set B with respect to set A. j represents images that corresponds to the nearest neighbor of i in set A. $y_i$ is a feature representation of image i in terms of the period style as obtained from, for example, an neural network for image recognition.

The confounding bias may be computed as the difference between the feature representation of the image and its nearest neighbor in the other set, as described above. This is because, any difference in the two images should correspond to bias in modeling artist's style, because as all other factors are same across the two sets A and B.

In some aspects, quantifying the confounding bias may permit the machine-learning model to be adjusted to reduce the or eliminate the confounding bias in the model. Quantifying the confounding bias may also permit identification of bias in generative artwork, or to identify influence of particular historical artwork on generative artwork. Quantifying the confounding bias may also assist in setting value and/or prices of generative artwork, or to assist art historians to study and understand the style of new artwork.

Furthermore, quantifying the confounding bias may also permit the machine-learning model to be adjusted to reduce or eliminate confounding bias. Accordingly, the bias estimation module 112 may be configured to adjust the machine-learning model based on the estimated confounding bias to reduce or eliminate the confounding bias.

Modifications, additions, or omissions may be made to FIG. 1A without departing from the scope of the present disclosure. For example, the environment 100 may include more or fewer elements than those illustrated and described in the present disclosure.

In addition, the different modules described with respect to the environment 100 may include code and routines configured to enable a computing device to perform one or more operations described with respect to the corresponding module. Additionally or alternatively, one or more of the modules may be implemented using hardware including a processor, a microprocessor (e.g., to perform or control performance of one or more operations), a field-programmable gate array (FPGA), or an application-specific integrated circuit (ASIC). In some other instances, one or more of the modules may be implemented using a combination of hardware and software. In the present disclosure, operations described as being performed by a particular module include operations that the particular module may direct a corresponding system to perform.

Further, in some embodiments, one or more routines, one or more instructions, or at least a portion of code of the two or more of the described modules may be combined such that they may be considered the same element or may have common sections that may be considered part of two or more of the modules. The delineation of the modules in the description and FIG. 1A accordingly is meant to ease in explanation of the operations being performed and is not provided as a limiting implementation or configuration.

Figure 2:
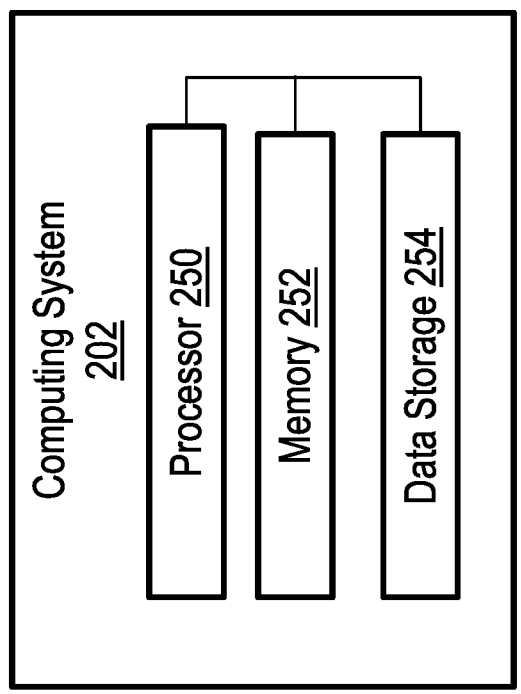
FIG. 2 illustrates a block diagram of an example computing system.

FIG. 2 illustrates a block diagram of an example computing system 202, according to at least one embodiment of the present disclosure. The computing system 202 may be configured to implement or direct one or more operations associated with a causal model module, a confounding factor identification module, and/or a bias estimation module (e.g., the causal model module 104, the structural causal model 106, and/or the bias estimation module 112 of FIG. 1A). The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, one or more of the above-mentioned modules (e.g., the causal model module 104, the structural causal model 106, and/or the bias estimation module 112 of FIG. 1A) may be included in the data storage 254 as program instructions. The processor 250 may fetch the program instructions of a corresponding module from the data storage 254 and may load the program instructions of the corresponding module in the memory 252. After the program instructions of the corresponding module are loaded into memory 252, the processor 250 may execute the program instructions such that the computing system may implement the operations associated with the corresponding module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
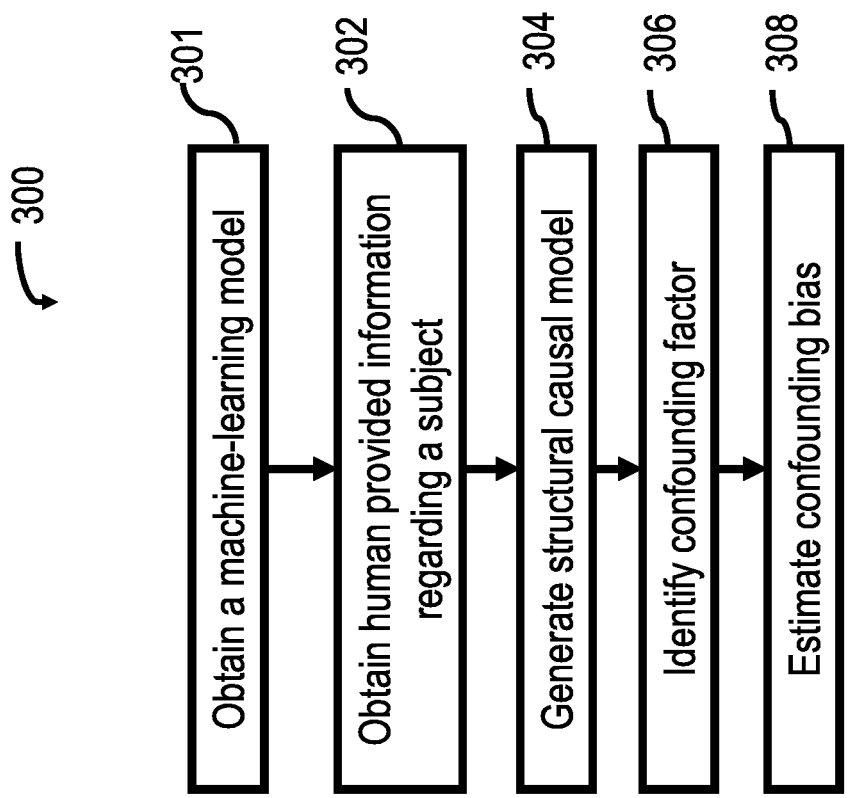
FIG. 3 is a flowchart of an example method of quantifying confounding bias based on expert knowledge.

FIG. 3 is a flowchart of an example method 300 of quantifying confounding bias based on expert knowledge, according to at least one embodiment described in the present disclosure. The method 300 may be performed by any suitable system, apparatus, or device. For example, one or more of the causal model module 104, the structural causal model 106, and/or the bias estimation module 112 of FIG. 1A, or the computing system 202 of FIG. 2 (e.g., as directed by one or more modules) may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

The method 300 may begin at block 301, where a machine-learning model may be obtained. The machine-learning model may be trained with respect to a subject. The machine-learning model may be based on a plurality of factors that correspond to the subject.

At block 302, where human provided expert information regarding the subject may be obtained. In some embodiments, the information may include the plurality of factors that each correspond to the subject. The expert information may indicate relationships between the plurality of factors with respect to how the plurality of factors affect each other;

At block 304, a structural causal model may be generated. In some embodiments, the structural causal model my indicate relationships between the plurality of factors with respect to how the plurality of factors affect each other. The structural causal model may be based on the expert information and may represent the relationships between the plurality of factors based. In some aspects, generating the structural causal model includes determining a dependency between the input factor and the output factor identified from the plurality of factors.

In some aspects, generating a structural causal model may include identifying from the plurality of factors an input factor and an output factor. The input factor may affect an outcome of the output factor, and therefore one of the factors may be identified as the input factor if it affects the outcome of another factor. Further, one of the factors may be identified as the output factor if it is affected by another factor (e.g., the input factor).

At block 306, a confounding factor may be identified. In some embodiments, a factor of the plurality of factors may be identified as a confounding factor because it causes a confounding bias with respect to the information regarding the subject. The factor of the plurality of factors may be identified as a confounding factor based on the structural causal model. In some aspects, identifying the factor as the confounding factor may include performing a causal inference analysis with respect to the structural causal model.

At block 308, the confounding bias may be estimated. Additionally or alternatively, the confounding bias may be quantified. In some embodiments, the confounding bias may be estimated based on the identified confounding factor. In some aspects, estimating the confounding bias may include determining a perceived causal effect related to the subject. Estimating the confounding bias may include determining an observed causal effect using an objective analysis architecture. Estimating the confounding bias may include determining a difference between the perceived causal effect and the observed causal effect In some embodiments of the method 300, the subject may be image classification. In such configurations, determining the perceived causal effect may include matching images based on the confounding factor. Additionally or alternatively, determining the observed causal effect may include matching images using a matching algorithm. The difference between the perceived causal effect and the observed causal effect may include a difference between the matching based on the confounding factor and the matching using the matching algorithm.

In some embodiments, the method 300 may further include adjusting the machine-learning model based on the estimated confounding bias to reduce and/or eliminate the confounding bias.

In some aspects of the method 300, the subject may be artwork and the human provided expert information may be obtained from an art expert.

The disclosed configurations are advantageous because they do not require ground truth regarding bias. Rather, bias may be tested based on assumptions of structure in the causal model. Such configurations may be applicable in different settings and are generalizable across data modalities. Furthermore, the disclosed configurations incorporate domain specific knowledge to improve bias identification and quantification.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 or data storage 254 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   obtaining a machine-learning model trained with respect to a subject, the machine-learning model being based on a plurality of factors that correspond to the subject;
   obtaining human provided expert information regarding the subject, the expert information indicating relationships between the plurality of factors with respect to how the plurality of factors affect each other;
   generating a structural causal model that represents the relationships between the plurality of factors based on the expert information;
   identifying, as a confounding factor and based on the structural causal model, a factor of the plurality of factors that causes a confounding bias in the machine-learning model;
   estimating the confounding bias based on the identified confounding factor, the estimating of the confounding bias including:
      obtaining real-world data corresponding to the subject;
      obtaining generated data corresponding the subject, the generated data being generated by the machine-learning model;
      determining a perceived causal effect related to the subject in which first matching of the real-world data and the generated data is performed by matching real-world data having the confounding factor with generated data having the confounding factor;
      determining an observed causal effect related to the subject in which second matching of the real-world data and the generated data is performed by using a matching algorithm configured to match the real-world data and the generated data based on shared features between the real-world data and the generated data;
      determining a difference between the first matching and the second matching, the difference indicating differences between which portions of the real-world data are matched with which portions of the generated data based on the first matching and which portions of the real-world data are matched with which portions of the generated data based on the second matching; and
      identifying and quantifying the confounding bias in the machine-learning model based on the difference between the first matching and the second matching; and
   adjusting the machine-learning model based on the confounding bias, as identified and quantified, by training the machine-learning model using training data that has been identified using the confounding bias as a particular factor corresponding therewith, the training being such that the confounding bias in the machine-learning model is reduced.

2. The method of claim 1, wherein the subject is artwork and the human provided expert information is obtained from an art expert.

3. The method of claim 1, wherein identifying the factor as the confounding factor includes performing a causal inference analysis with respect to the structural causal model.

4. The method of claim 1, wherein generating the structural causal model includes:
   identifying, from the plurality of factors, an input factor and an output factor in which the input factor affects an outcome of the output factor, and
   determining a dependency between the input factor and the output factor.

5. The method of claim 1, wherein:
   the subject is image classification; and
   the real-world data and the generated data respectively include images.

6. A system comprising:
   one or more processors; and
   one or more computer-readable storage media storing instructions that, in response to being executed by the one or more processors cause the system to perform operations, the operations comprising:
      obtaining a machine-learning model trained with respect to a subject, the machine-learning model being based on a plurality of factors that correspond to the subject;
      obtaining human provided expert information regarding the subject, the expert information indicating relationships between the plurality of factors with respect to how the plurality of factors affect each other;
      generating a structural causal model that represents the relationships between the plurality of factors based on the expert information;
      identifying, as a confounding factor and based on the structural causal model, a factor of the plurality of factors that causes a confounding bias in the machine-learning model;
      estimating the confounding bias based on the identified confounding factor, the estimating of the confounding bias including:
         obtaining real-world data corresponding to the subject;
         obtaining generated data corresponding the subject, the generated data being generated by the machine-learning model;
         determining a perceived causal effect related to the subject in which first matching of the real-world data and the generated data is performed by matching real-world data having the confounding factor with generated data having the confounding factor;
         determining an observed causal effect related to the subject in which second matching of the real-world data and the generated data is performed by using a matching algorithm configured to match the real-world data and the generated data based on shared features between the real-world data and the generated data;
         determining a difference between the first matching and the second matching, the difference indicating differences between which portions of the real-world data are matched with which portions of the generated data based on the first matching and which portions of the real-world data are matched with which portions of the generated data based on the second matching; and identifying and quantifying the confounding bias in the machine-learning model based on the difference between the first matching and the second matching; and adjusting the machine-learning model based on the confounding bias, as identified and quantified, by training the machine-learning model using training data that has been identified using the confounding bias as a particular factor corresponding therewith, the training being such that the confounding bias in the machine-learning model is reduced.

7. The system of claim 6, wherein the subject is artwork and the human provided expert information is obtained from an art expert.

8. The system of claim 6, wherein identifying the factor as the confounding factor includes performing a causal inference analysis with respect to the structural causal model.

9. The system of claim 6, wherein generating the structural causal model includes:

identifying, from the plurality of factors, an input factor and an output factor in which the input factor affects an outcome of the output factor, and determining a dependency between the input factor and the output factor.

10. The system of claim 6, wherein:

the subject is image classification; and the real-world data and the generated data respectively include images.

11. One or more computer-readable storage media storing instructions that, in response to being executed by one or more processors cause a system to perform operations, the operations comprising:

obtaining a machine-learning model trained with respect to a subject, the machine-learning model being based on a plurality of factors that correspond to the subject;

obtaining human provided expert information regarding the subject, the expert information indicating relationships between the plurality of factors with respect to how the plurality of factors affect each other;

generating a structural causal model that represents the relationships between the plurality of factors based on the expert information;

identifying, as a confounding factor and based on the structural causal model, a factor of the plurality of factors that causes a confounding bias in the machine-learning model;

estimating the confounding bias based on the identified confounding factor, the estimating of the confounding bias including:

obtaining real-world data corresponding to the subject;

obtaining generated data corresponding the subject, the generated data being generated by the machine-learning model;

determining a perceived causal effect related to the subject in which first matching of the real-world data and the generated data is performed by matching real-world data having the confounding factor with generated data having the confounding factor;

determining an observed causal effect related to the subject in which second matching of the real-world data and the generated data is performed by using a matching algorithm configured to match the real-world data and the generated data based on shared features between the real-world data and the generated data;

determining a difference between the first matching and the second matching, the difference indicating differences between which portions of the real-world data are matched with which portions of the generated data based on the first matching and which portions of the real-world data are matched with which portions of the generated data based on the second matching; and identifying and quantifying the confounding bias in the machine-learning model based on the difference between the first matching and the second matching; and adjusting the machine-learning model based on the confounding bias, as identified and quantified, by training the machine-learning model using training data that has been identified using the confounding bias as a particular factor corresponding therewith, the training being such that the confounding bias in the machine-learning model is reduced.

12. The one or more computer-readable storage media of claim 11, wherein identifying the factor as the confounding factor includes performing a causal inference analysis with respect to the structural causal model.

13. The one or more computer-readable storage media of claim 11, wherein generating the structural causal model includes:

identifying, from the plurality of factors, an input factor and an output factor in which the input factor affects an outcome of the output factor, and determining a dependency between the input factor and the output factor.

14. The one or more computer-readable storage media of claim 11, wherein:

the subject is image classification; and the real-world data and the generated data respectively include images.

* * * * *